Patented Apr. 5, 1949

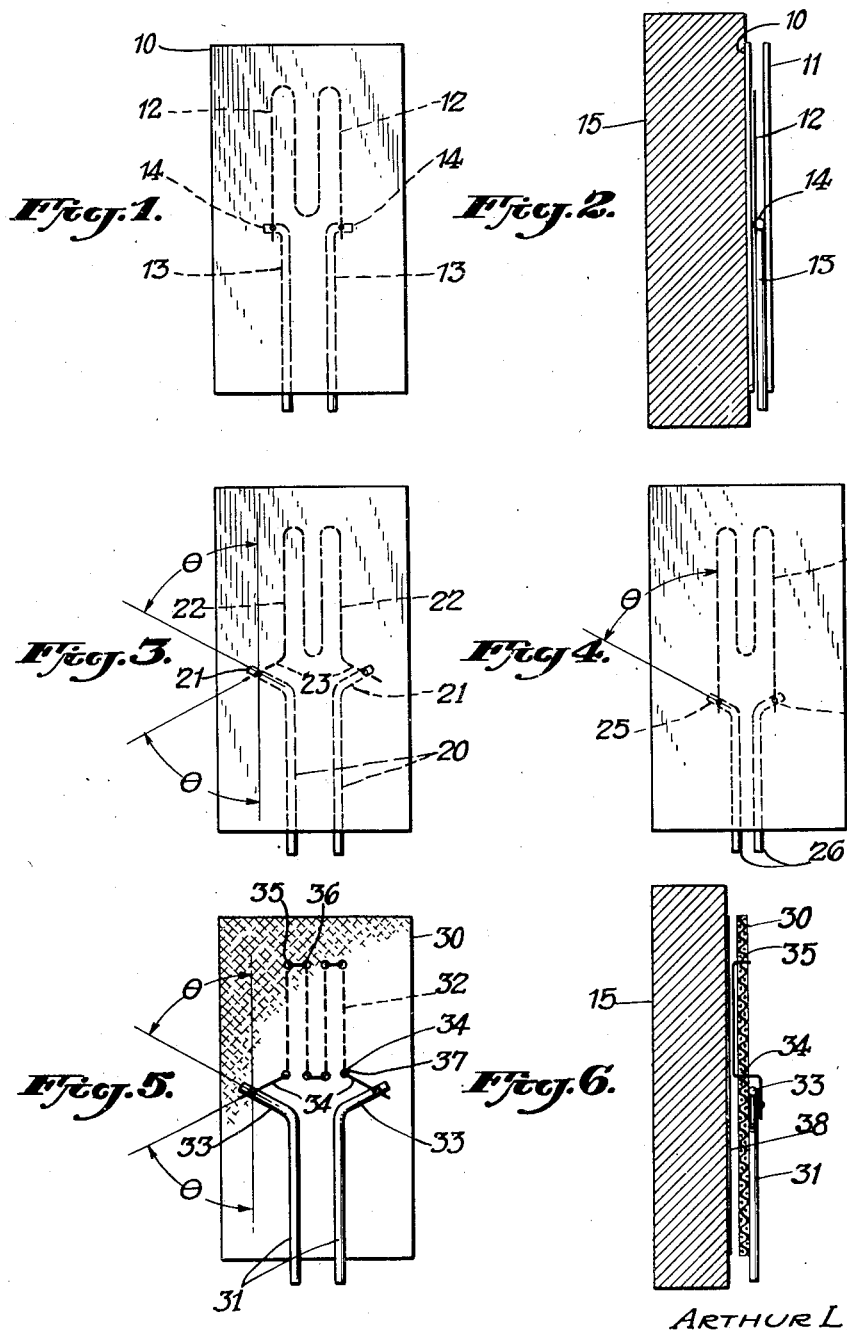

2,466,337

UNITED STATES PATENT OFFICE 2,466,337

ELECTRIC STRAIN GAUGE

Arthur L. Thurston, Wantagh, and James O. Irwin, Great Neck, N. Y., assignors to Cox & Stevens Aircraft Corporation, Mineola, N. Y., a corporation of New York Application January 20, 1945, Serial No. 573,664

13 Claims. (Cl. 201—63)

This invention relates to improvements in strain gages of the electrical resistance type, the improvements being particularly adapted for use in connection with strain gages of such type which are intended to be bonded to a strain element.

According to the present practice, strain gages of this type are generally constructed by sandwiching between two pieces of thin paper or the like, a length of resistance wire, the ends of which are joined to conductors providing terminal connections, for connecting the gage to suitable known forms of circuits including indicating instruments. The papers are impregnated and bonded together with a suitable adhesive and the gage assembly is designed to be bonded to the surface of a member subjected to the strain which is to be measured, such strain being measured by the change in resistance of the strain gage. Knowing the strain in the member, stresses may be calculated and under certain adaptations the load causing the strain may be determined.

The objects of the present invention include the provision of certain improved features of construction and methods of positioning or applying the resistance filament or its terminal connections or both, so as to eliminate several disadvantages which have been encountered with strain gages of this type and particularly where very exact measurements are to be made, as for example when the gages are used as a part of accurate weighing apparatus. For reasons hereinafter explained, with the type of construction heretofore used, certain errors occur in the response of the strain gage as a result of effects occurring at the region of juncture of the resistance filament and the terminal connections therefor. With the present invention these errors may be minimized or effectively eliminated without materially adding to the complexity of the construction or its cost of manufacture, and while still providing a construction which may be bonded to the strain element with no more difficulty than in the case of the constructions heretofore available.

The invention in certain of its embodiments also includes features minimizing the effect of shear in the bonding material and any resultant tendency of the bonding material to flow and cause changes in resistance when strained over a period of time.

Various further and more specific objects, features and advantages of the invention will clearly appear from the detailed description given below taken in connection with the accompanying drawings which form a part of this specification and illustrate by way of example, several forms of the invention. The invention consists in such novel features, combinations of parts, methods and method steps as may be shown and described in connection with the constructions herein disclosed.

In the drawings:

Fig. 1 is a plan view of a strain gage construction of the type heretofore known;

Fig. 2 is a vertical sectional view of the same known type of gage as applied to a strain element;

Figs. 3–5 inclusive are plan views showing respectively strain gages according to three different embodiments of the present invention; and Fig. 6 is a vertical sectional view of the embodiment of Fig. 5 as applied to a strain element.

The dimensions and spacing of certain of the parts in the drawings, and more particularly in Figs. 2 and 6, are shown somewhat exaggerated for clearness.

The type of construction heretofore known, such as shown in Figs. 1 and 2, may embody areas of paper as at 10, 11 which may for example each be of a thickness of about 0.002 to 0.003 inch and between which is located a resistance wire or filament 12 formed in the shape of a grid and attached as by solder to conductors as at 13 formed for example of copper, to provide terminal connections. The resistance wire or filament 12 is generally quite fine, having for example a diameter of approximately 0.001 inch. On the other hand, the conductors 13 are generally of a substantially larger diameter, for example approximately 0.01 inch, and are bent at right angles at their ends 14, so that straight lengths of the resistance filament may be soldered thereto as shown. The whole assembly may be bonded together and bonded to a strain member such as at 15 by suitable adhesive.

In operation such gages are so firmly bonded throughout to a strain member, that any strain or deformation of the strain member will impart a similar strain or deformation to the resistance wire, thereby changing its resistance, the change in resistance being a measure of the strain or deformation in the strain member to which the gage is attached. For example, with the gage of Figs. 1 and 2, if a strain is applied to member 15 in a vertical direction, the straight vertical filament portions of the grid 12 will be subjected to a compression strain thereby decreasing the resistance thereof. However, at the same time, strain or deformation of the member 15 also imparts a strain to the terminal conductors 13. These conductors being of low resistance as compared with the filament 12, do not materially affect the total resistance.

However, the actual forces in the terminal leads and in the resistance wire portions adjacent thereto, may vary greatly, as may also the forces within the bonding material at the region of juncture of the terminal conductors and filament. As a result, the portions of the filament at these regions are subjected to strains which are not proportional to the strain in the adjacent parts of the strain element, and in a manner to cause the response of the strain gage to be excessive or too small. So far as is known, these facts have not heretofore been appreciated.

In the embodiment of the invention illustrated in Fig. 3, the terminal conductors 20 are bent as at 21 at the regions of juncture with the resistance filament 22, so as to extend along lines forming a predetermined angle $\theta$ with respect to the active straight portions of the filament 22. The manner of properly determining such angle will be explained hereinafter. Also the end portions 23 of the filament 22 at the region of juncture with the terminal conductors, are preferably bent as shown, to extend along a line forming a like predetermined angle with respect to the active straight portions of the filament which in turn extend along the direction of the major strain. In other respects the construction of Fig. 3 may be the same or similar to that of Figs. 1 and 2.

The method of determining the proper angle $\theta$ will now be explained. As is well understood, if the surface of a member is subjected to a strain in one direction, a strain of opposite sign is set up at right angles to such direction and proportional to Poisson's ratio for the material of which the strained member is formed. Thus if a circle is drawn on the surface of the member when unstrained, the circle will take the form of an ellipse when the surface is subjected to strain. If the major strain, for example, is one of compression, the diameter of the circle will be shortened along the direction of such major strain. If we let $s$ equal the amount of such shortening, the diameter at right angles to this direction will be increased by $\mu s$, where $\mu$ equals Poisson's ratio for the material. A circle concentric with the resulting ellipse and having a diameter equal to that of the original circle will then intersect the ellipse at four points, which are the extremities of two diameters of the ellipse. It will be apparent that these diameters are lines along which there is no strain. If we denote by $\theta$ the angle which the diameters make with the major strain axis, then—

(1)
$$\text{Cotangent } \theta = \frac{1+\epsilon}{1-\mu\epsilon}\sqrt{\frac{\mu(2-\mu\epsilon)}{2+\epsilon}}$$

where $\mu$ denotes Poisson's ratio and $\epsilon$ denotes unit strain (with the usual convention as to sign). Upon total release of strain, the ellipse and its no-strain diameters revert to the original circle and two diameters, the latter assuming directions given by the equation—

(2)
$$\text{Cotangent } \theta = \sqrt{\frac{\mu(2-\mu\epsilon)}{2+\epsilon}}$$

Since in practice $\epsilon$ is small compared to 2, it has been found that the above formula may be satisfactorily approximated by the simple formula—

(3)
$$\text{Cotangent } \theta = \sqrt{\mu}$$

To determine the probability that this simple formula would satisfactorily approximate Formula 2 above, an investigation of such probability by the law of the mean was made. This revealed that for the range of values of $\mu$ and $\epsilon$ encountered in practice for strain elements of the commonly available materials ($.25 \leq \mu \leq .45$; $-.002 \leq \epsilon \leq .002$) then $\theta$ as given by the simplified Formula 3 differs from the value given by the exact Formula 2 by not more than one and two-tenths minutes (1.2'). This difference is too small to ordinarily involve any necessity for taking it into consideration in constructing gages such as of Fig. 3. Since the simplified formula is independent of any strain factor, it is apparent that the angle $\theta$ as shown in Fig. 3 is for practical purposes independent of the magnitude of the applied strain.

It is therefore apparent that a line drawn on an unstrained surface and making an angle, cotan $^{-1}\sqrt{\mu}$, with the direction along which the major strain is to be applied, will remain practically invariant in length under strain. Accordingly in Fig. 3 the end portions 23 of the resistance wire, as well as the end portions 21 of the terminal lead wires 20, are brought over at the angle $\theta$ before being soldered or welded to each other, thus incorporating a short length of unstrained resistance wire and unstrained lead wire adjacent to the point of juncture. This prevents the terminal leads from having any possible effect on the resistance wire as a consequence of strains to which the gage is subjected, assuming that the major strain is applied vertically with the gage as shown in Fig. 3.

The value of Poisson's ratio varies from a minimum of about 0.25 to a maximum of about 0.45 for the various commonly available materials of which strain elements are formed in practice. With this range of Poisson ratio values, the angle $\theta$ may be calculated as having a range of values from about 63° to 56°. If the strain gages are to be used with metal strain elements, as is ordinarily the case, for example steel, it will be found by calculation that generally the angle $\theta$ should preferably be in the neighborhood of 61° to insure best results. However, variations of several degrees in either direction will ordinarily be insufficient to cause any appreciable difference in the accuracy of the results obtainable.

The embodiment of the invention shown in Fig. 4 is like that of Fig. 3 except that here only the end portions 25 of the conductor terminals 26 are bent to the angle $\theta$ as shown. That is, the end portions of the resistance filament 27 are here made straight as in the case of Fig. 1. For many purposes the construction of Fig. 4 may prove to be sufficiently accurate, since here the end portions of the leads, which were evidently the major source of the inaccuracies encountered, are positioned along lines such that no strain will be applied thereto when the major strain is vertical along the direction of the straight portions of the filament 27.

Figs. 5 and 6 illustrate an alternative embodiment of the invention including the advantageous features of the forms of Figs. 3 and 4 as well as additional improvements. In the gages described above, a thin piece of impregnated paper is interposed between the resistance wire and the strain member to which the gage is bonded. In order to have like strains in the resistance wire and in the strain member, the distance between them should be kept as small as possible to minimize any shearing effects in the bonding material and the resulting tendency of the bonding material to flow and cause changes in resistance when strained over a period of time. Also the bonding material should be as rigid as possible, that is, if bonded to a steel member for example, the properties of the bond should conform to the properties of the steel as nearly as possible, particularly as to rigidity. We have found that these conditions may be closely approached to a degree beyond that heretofore obtained, by utilizing fiber glass cloth impregnated with a phenolic formaldehyde resin. Accordingly there is shown at Figs. 5 and 6 a gage adapted to be bonded to a member 15 formed for example of steel, and the gage having a base 30 formed of fiber glass cloth. The terminal conductors 31 as shown may be positioned on the outside of the cloth 30, viz., on the side opposite from the member 15. The resistance filament 32 may be soldered as at 33 to one of the terminal conductors 31 and then brought over a short distance and sewn through the cloth at 34, then extended up along the inside surface of the cloth in the direction of the strain to be measured, and again sewn back through the cloth as at 35 to the outside surface thereof. From this point the filament may be brought over a short distance and again passed down through the cloth as at point 36, the process being repeated to form a grid with as many legs as desired and the filament being finally brought out through the cloth to the outside surface as at 37. From this point the filament may be brought over a short distance and soldered or welded as shown to the other terminal 31. With this construction only the lengths of the resistance wire which are in line with the strain to be measured are positioned close to the strained member 15, all of the cross portions of the filament grid, as well as the terminals being separated from the strain member by the thickness of the cloth 30.

In constructing this form of gage the impregnated fiber glass cloth may be stretched over a suitable frame and while the terminal wires are held in place, the resistance wire may be attached and sewn as described. Before removing the frame, the whole assembly may be impregnated with the phenolic formaldehyde resin which is allowed to air-dry. The assembly is then rigid enough to be removed from the frame and trimmed to the desired size, ready for attaching to the strain member. The strain member 15 is coated with a suitable adhesive as at 38, preferably the same form of phenolic formaldehyde resin, whereupon the gage is applied and baked in place under heat and pressure. The adhesive or resin coating 38 should preferably be of a minimum thickness and sufficient only to provide the necessary insulation between the gage and the strain member.

It will be apparent that portions of the strain gage resistance filament other than the terminal portions, and in which it may be desired to avoid strains, may also be bonded in a position to extend along a line which is at an angle of from 56 to 63° to the direction of the major strain, thereby minimizing or avoiding strains in such portions if desired for any particular reason.

While the invention has been described in detail with respect to certain preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In a strain gage of the electrical resistance type adapted to be bonded to a strain element, a resistance filament having an active portion adapted to extend along the direction of the strain to be measured, a conductor having a portion joined to said filament for providing a terminal connection, an area of insulation bonding material applied to said filament and conductor, said conductor portion at the region of juncture with said filament, extending along a line which is at an angle of from about 56 to 63 degrees with respect to said active filament portion.

2. In a strain gage of the electrical resistance type adapted to be bonded to a strain element, a resistance filament having an active portion adapted to extend along the direction of the strain to be measured, a conductor having a portion joined to said filament for providing a terminal connection, an area of insulation bonding material applied to said filament and conductor, said filament at the region of juncture with said conductor extending along a line which is at an angle of from about 56 to 63 degrees with respect to said active filament portion.

3. In a strain gage of the electrical resistance type adapted to be bonded to a strain element, a resistance filament having an active portion adapted to extend along the direction of the strain to be measured, a conductor having a portion joined to said filament for providing a terminal connection, an area of insulation bonding material applied to said filament and conductor, said filament at the region of juncture with said conductor extending along a line which is at an angle of from about 56 to 63 degrees with respect to said active filament portion, said conductor portion at said region also extending along a line at an angle of from about 56 to 63 degrees, measured in the opposite direction, with respect to said active filament portion.

4. In a strain gage of the electrical resistance type adapted to be bonded to a strain element, a resistance wire and a terminal connection wire joined thereto, said wires approaching the point of juncture along lines which are respectively at angles measured in opposite directions and of about 56–63 degrees with respect to a single straight line drawn through said point.

5. In the combination of a strain gage of the electrical resistance type, and a strain element to which said gage is bonded, said gage including a resistance element and a terminal conductor joined thereto, said conductor approaching the point of juncture along a line forming a predetermined angle with respect to the direction of major strain in said strain element, said angle being in the neighborhood of one having a cotangent equal to $\sqrt{\mu}$, where $\mu$ denotes Poisson's ratio for the material of which the strain element is formed.

6. In the combination of a strain gage of the electrical resistance type, and a strain element to which said gage is bonded, said gage including a resistance element and a terminal conductor joined thereto, said resistance element approaching the point of juncture along a line forming a predetermined angle with respect to the direction of major strain in said strain element, said angle being in the neighborhood of one having a cotangent equal to $\sqrt{\mu}$, where $\mu$ denotes Poisson's ratio for the material of which the strain element is formed.

7. In the construction of electrical resistance type bonded strain gages adapted to respond principally to strains applied in a predetermined direction and having terminal connections bonded in place, the method of avoiding strains in any desired bonded portion of the circuit in the gage, which comprises bonding such portion to extend along a line at an angle of approximately 56 to 63 degrees with respect to said direction.

8. A strain gage comprising a grid of resistance wire, and an area of insulation fabric bonded thereto and through which said wire is sewn to form such grid with the active stretches of the gage wire on one surface of the fabric and with the wire portions which connect such active stretches on the other surface of the fabric.

9. A strain gage comprising a length of resistance wire bonded by insulation adhesive to one surface of an area of fiber glass material, a terminal portion of such wire extending through said material to the opposite surface thereof and bonded thereon.

10. In combination with a strain element, a coating of insulation bonding material thereon, an area of insulation fabric, and a strain gage resistance wire sewn through such fabric with the active portions of such wire on one surface of the fabric, which surface is bonded to said coating, other circuit connecting portions of said wire extending along the opposite surface of the fabric.

11. Method for making a strain gage, which comprises holding an area of insulation fabric under tension while sewing therethrough a strain gage resistance filament grid, and applying resinous adhesive to form a relatively rigid assembly.

12. In the combination of a strain gage of the electrical resistance type, and a strain element formed of a material for which Poisson's ratio is $\mu$ and to which said gage is bonded, said gage including a resistance element having an active portion adapted to extend along the direction of major strain to be measured, and a terminal conductor therefor, adapted for connection of the gage to resistance-measuring apparatus, said conductor approaching the point of its juncture with said element along a line forming a predetermined angle substantially less than 90° with respect to said direction, said angle sufficiently approximating one having a cotangent equal to $\sqrt{\mu}$ whereby the effects of strains in said direction on said conductor adjacent said point of juncture are insufficient to materially affect the resistance measurements of the gage in normal use.

13. In the combination of a strain gage of the electrical resistance type, and a strain element formed of a material for which Poisson's ratio is $\mu$ and to which said gage is bonded, said gage including a resistance element having an active portion adapted to extend along the direction of major strain to be measured, and a terminal conductor therefor, adapted for connection of the gage to resistance-measuring apparatus, said resistance element having a portion approaching the point of its juncture with said conductor along a line forming a predetermined angle substantially less than 90° with respect to said direction, said angle sufficiently approximating one having a cotangent equal to $\sqrt{\mu}$ whereby the effects of strains in said direction on said element adjacent said point of juncture are insufficient to materially affect the resistance measurements of the gage in normal use.

ARTHUR L. THURSTON.
JAMES O. IRWIN.

REFERENCES CITED

The following references are of record in the file of this patent:

UNITED STATES PATENTS

| Number | Name | Date |
| --- | --- | --- |
| 1,963,554 | McDill | June 19, 1934 |
| 2,251,697 | Van Daam et al. | Aug. 5, 1941 |
| 2,341,219 | Jones | Feb. 8, 1944 |
| 2,345,300 | Simpson et al. | Mar. 28, 1944 |
| 2,364,076 | Jordon | Dec. 5, 1944 |
| 2,386,879 | Ostergren | Oct. 16, 1945 |